United States Patent
Hirooka et al.

(10) Patent No.: US 7,674,052 B2
(45) Date of Patent: Mar. 9, 2010

(54) OBJECT DETECTION APPARATUS

(75) Inventors: Shinichiro Hirooka, Fujisawa (JP); Norihiko Nakano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 342 days.

(21) Appl. No.: 11/686,433

(22) Filed: Mar. 15, 2007

(65) Prior Publication Data

US 2007/0217780 A1    Sep. 20, 2007

(30) Foreign Application Priority Data

Mar. 17, 2006   (JP)   ............... 2006-073728

(51) Int. Cl.
  *G03B 17/00*   (2006.01)
(52) U.S. Cl. ..................... 396/439; 396/427
(58) Field of Classification Search ............... 396/121, 396/153, 287, 427, 433, 439; 348/135, 142, 348/143, 152, 207.11, 208.11, 208.14
See application file for complete search history.

(56) References Cited

U.S. PATENT DOCUMENTS 4,737,847 A    4/1988   Araki et al.

2004/0032494 A1    2/2004   Ito et al.
2007/0008411 A1*   1/2007   Shibata et al. ............. 348/152

FOREIGN PATENT DOCUMENTS

| JP | 9-282459 | 10/1997 |
| JP | 2005-347926 | 12/2005 |
| WO | WO 01/39513 | 5/2001 |
| WO | WO 2004/029502 | 4/2004 |

* cited by examiner

*Primary Examiner*—Rodney E Fuller
(74) *Attorney, Agent, or Firm*—Antonelli, Terry, Stout & Kraus, LLP.

(57) ABSTRACT

An improved object detection apparatus using an interface with which user can set an object detection area intuitively with simple operation. Apparatus includes imaging module imaging and outputting an imaged picture, three-dimensional position detection module detecting a three-dimensional position and outputting detected position information, input module allowing user to input data for setting a detection area and processing module conversion-processing and outputting the picture. Using detection area setting data inputted by user, detection area in the three-dimensional space is decided and whether the three-dimensional position detected by the position detection module exists inside or outside the detection area is judged. Picture outputted by the imaging module is subjected to conversion processing based on judgment result and detection area is clearly indicated in the picture.

9 Claims, 10 Drawing Sheets

FIG. 7
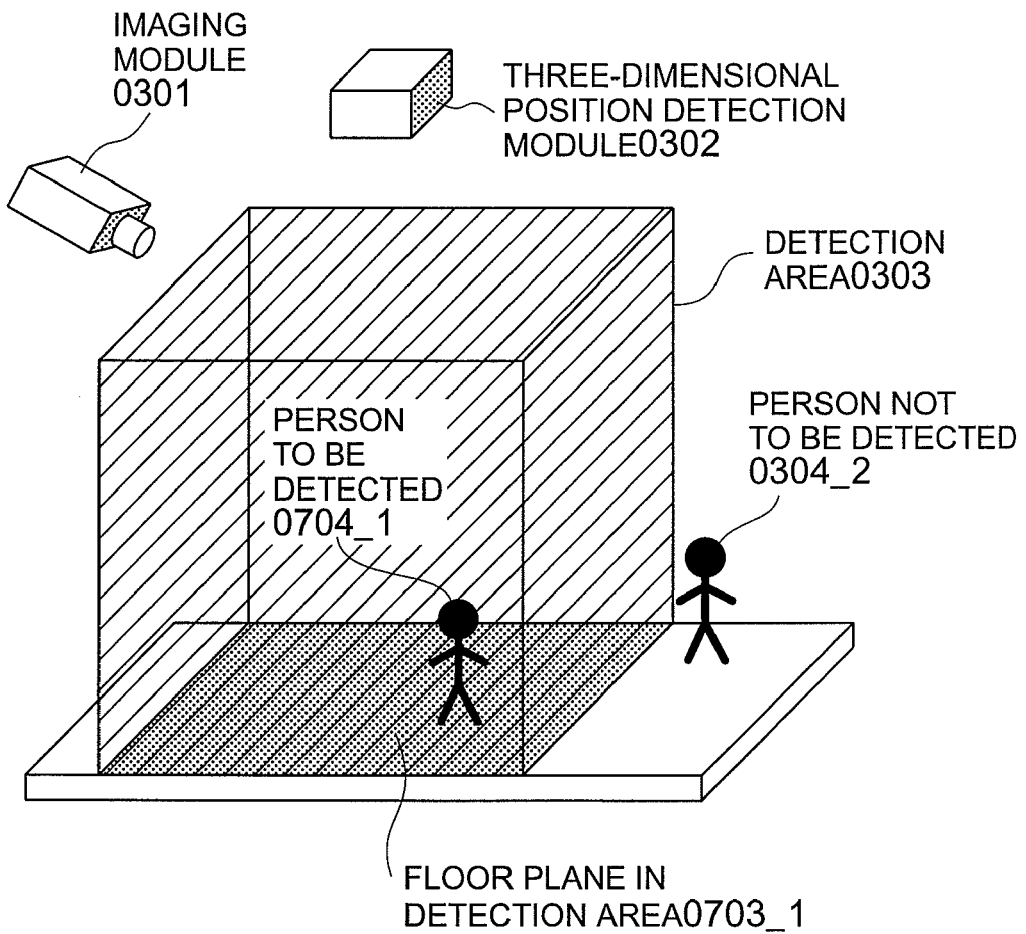
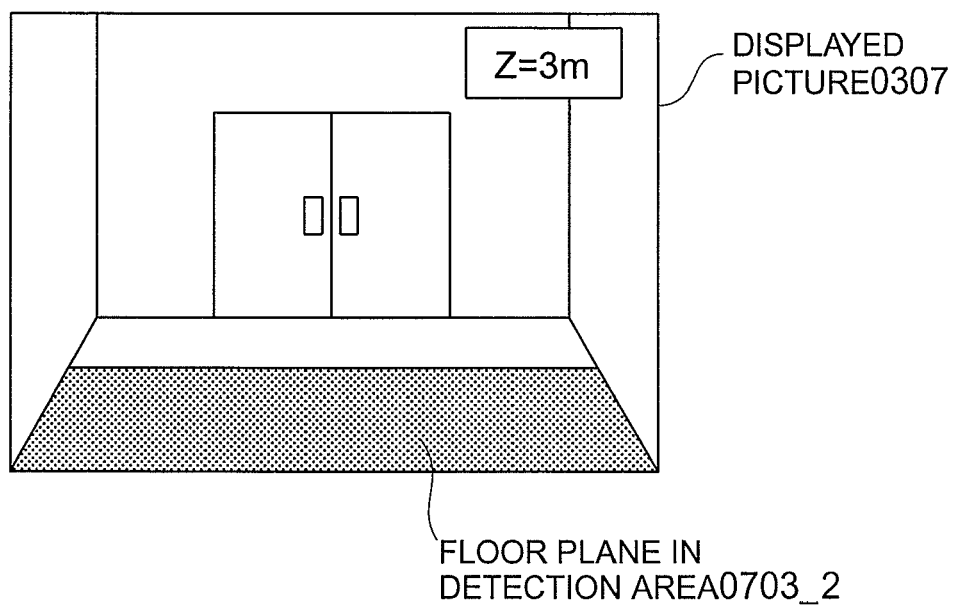

FIG. 8
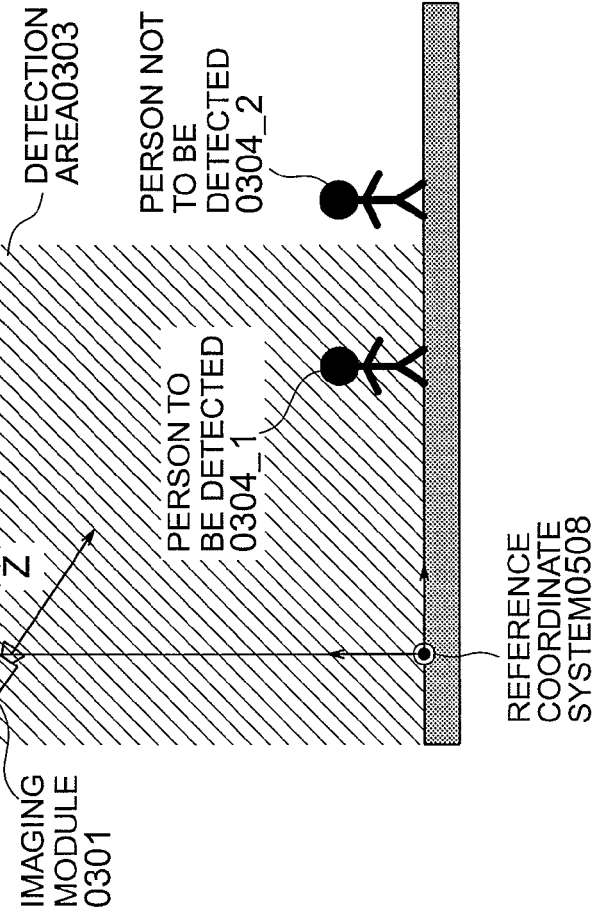
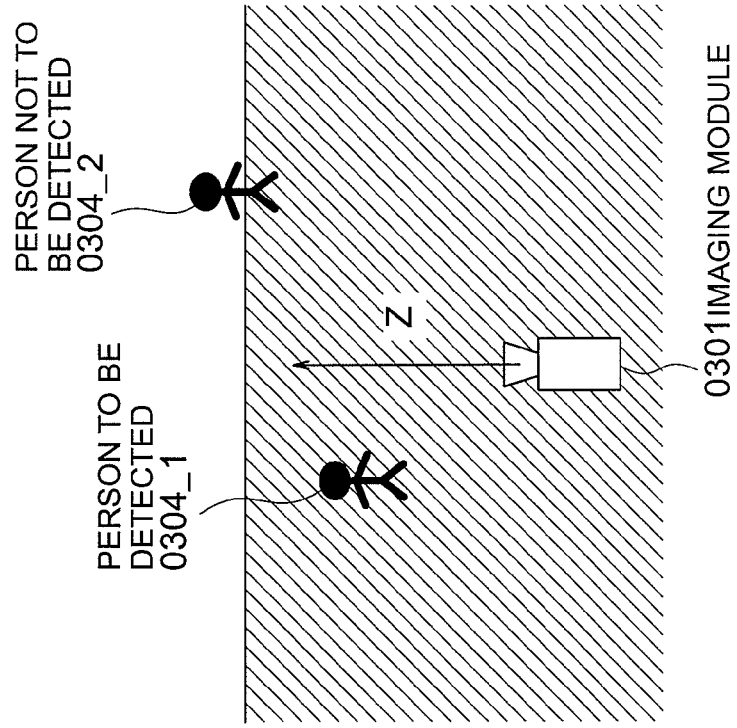

FIG. 10
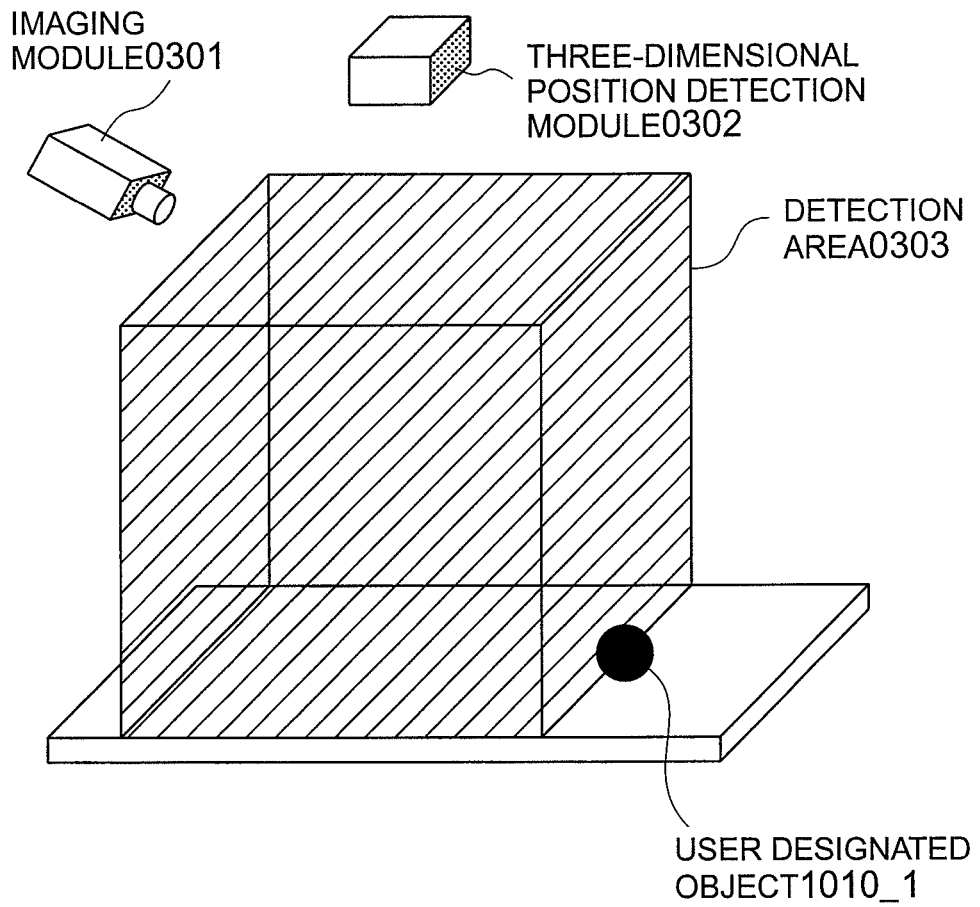
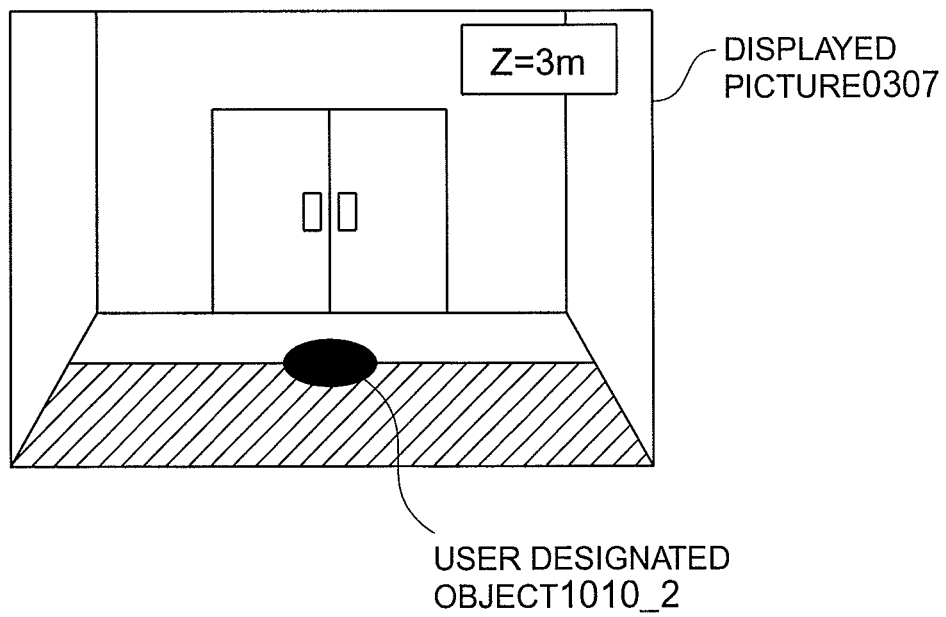

OBJECT DETECTION APPARATUS

INCORPORATION BY REFERENCE

The present application claims priority from Japanese application JP 2006-073728 filed on Mar. 17, 2006, the content of which is hereby incorporated by reference into this application.

BACKGROUND

The present invention relates to an object detection apparatus.

The background art of the technical field is described in JP-A-2005-347926, for example. This publication discloses the art having the object of "whether anything unusual is present or not is detected on the basis of change of an object to be imaged regardless of a position of the object within a predetermined imaging area" and the solution of "according to the present invention, there is provided a monitoring apparatus comprising imaging means to image a picture of an object to be imaged within a predetermined area successively, detection means to detect change of the object in the picture and an amount of the change, distance measurement means to measure a distance between the object of which change is detected by the detection means and the imaging means and judgment means to judge whether the change of the object is unusual or not on the basis of the distance measured by the distance measurement means and the change amount of the object detected by the detection means".

SUMMARY

As described in JP-A-2005-347926, picture processing means to the picture acquired by the imaging means is combined with three-dimensional position information acquired by three-dimensional position detection means, so that performance of an object detection apparatus can be improved and the object detection apparatus can be applied widely.

The object detection technique can be applied widely so that a detection area can be designated to thereby exclude the area where wrong detection is made or detection accuracy is deteriorated as being out of detection or judge movement of an object intruding into the detection area from the outside thereof so that intrusion is detected. When the three-dimensional position information is used for detection of an object, it is necessary to decide even the detection area in the three-dimensional space. The three-dimensional position of the detection area may be previously set and the three-dimensional position information may be stored in a memory, while when it is considered that the place where a detection device is installed or a detection environment such as the detection area is changed, it is desired that the user can change the detection area if necessary.

However, when the user changes the detection area in the three-dimensional space, input information necessary for the change is three-dimensional position information and accordingly data is difficult to handle and input operation is also complicated. Further, the user also cannot visibly recognize the currently set detection area as a picture and accordingly there arises a problem that the detection area is difficult to grasp.

Accordingly, for example, in the object detection apparatus using the picture and the three-dimensional position information, an user interface which can be operated easily and by which current setting can be grasped easily is used to set the detection area simply, so that operability can be improved.

It is an object of the present invention to improve the operability of an object detection apparatus.

The present invention is summarized as follows. In the object detection apparatus, detection area setting data for making the user set an detection area is inputted and a picture imaged by an imaging module is subjected to conversion processing so that the inside and the outside of the detection area can be distinguished to display the detection area. The conversion processing is to convert, for example, the brightness signal or the color signal to brighten or darken the detection area or display the detection area with different color. Thus, the detection area can be expressed clearly to the user.

According to the present invention, the operability of the object detection apparatus can be improved.

BRIEF DESCRIPTION OF THE DRAWINGS

These and other features, objects and advantages of the present invention will become more apparent from the following description when taken in conjunction with the accompanying drawings wherein:

FIG. 7 is a schematic diagram illustrating an example of an object detection apparatus according to a fifth embodiment of the present invention;

FIG. 8 is a schematic diagram illustrating a first example of an object detection apparatus according to a sixth embodiment of the present invention;

FIG. 10 is a schematic diagram illustrating an example of an object detection apparatus according to a seventh embodiment of the present invention.

DETAILED DESCRIPTION OF PREFERRED EMBODIMENTS

Embodiments of the present invention are now described with reference to the accompanying drawings.

Embodiment 1

Figure 1:
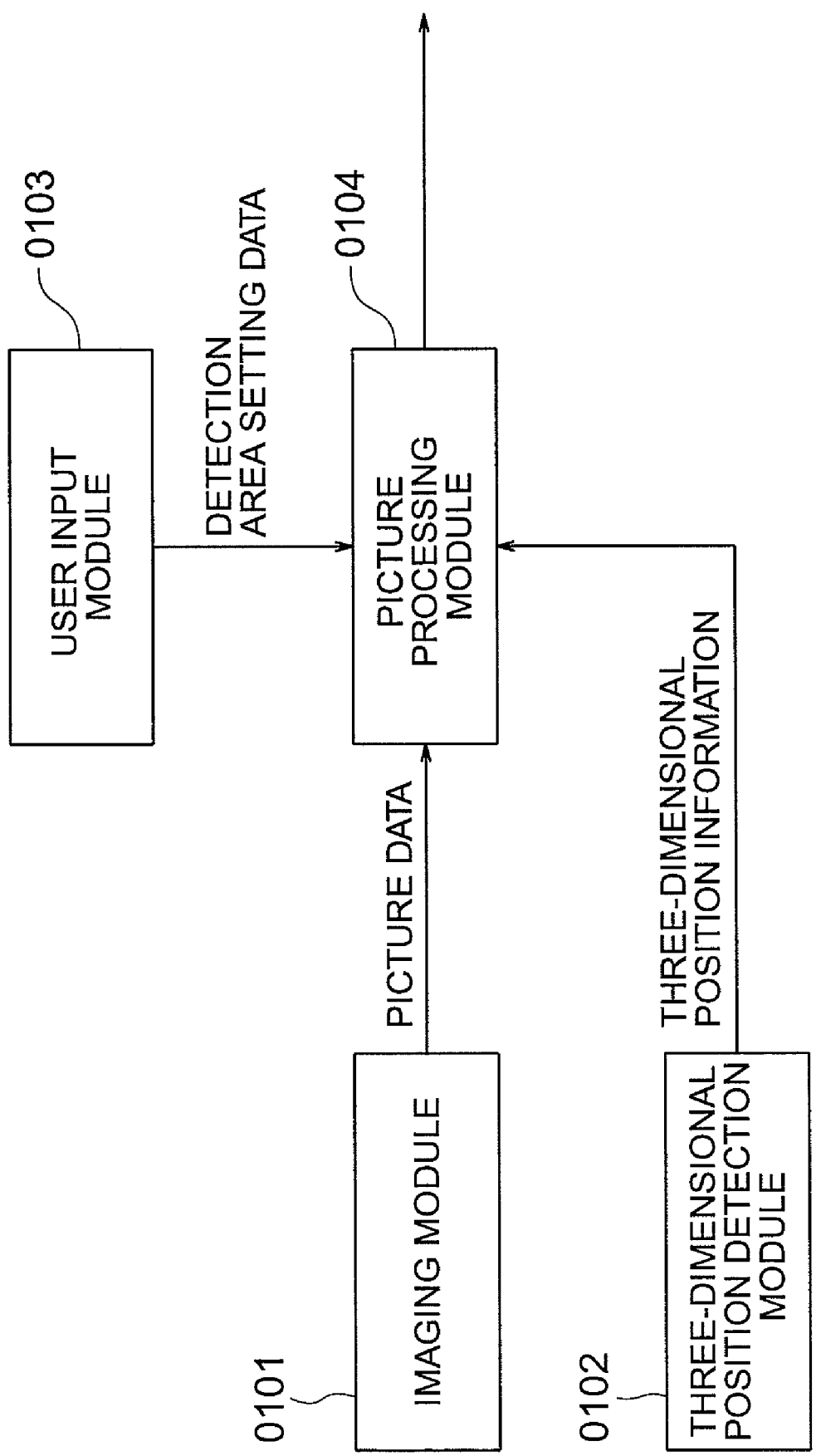
FIG. 1 is a schematic diagram illustrating an object detection apparatus according to a first embodiment of the present invention.

FIG. 1 is a schematic diagram illustrating an object detection apparatus according to a first embodiment of the present invention. In FIG. 1, numeral 0101 denotes an imaging module, 0102 a three-dimensional position detection module, 0103 a user input module and 0104 a picture processing module.

In the object detection apparatus shown in FIG. 1, the imaging module 0101 includes a lens, a shutter, an imaging element, an automatic gain control (AGC) part, an analog-to-digital (AD) converter, a digital signal processor (DSP) for processing a camera signal, a timing generator and the like and makes imaging by photoelectric conversion to output picture data. The imaging module is not limited to be single in number and may be plural including two or more in number, the plural imaging modules being installed in different positions. The three-dimensional position detection module 0102 detects a three-dimensional position of an object existing in space and outputs three-dimensional coordinates thereof as three-dimensional position information. The three-dimensional position information contains a distance map by way of example. The three-dimensional position detection module can use a distance sensor such as a stereo camera and a laser radar having the space resolution. The user input module 0103 can use an external interface such as cross key, jog dial, keyboard and mouse to input detection area setting data necessary for the user to set the detection area of the object. The picture processing module 0104 can use the detection area setting data inputted from the user input module 0103 to decide the detection area and make judgment processing for judging whether each of the three-dimensional coordinates exists inside or outside the detection area on the basis of the three-dimensional position information outputted by the three-dimensional position detection module 0102. Then, the picture processing module subjects the picture outputted by the imaging module 0101 to conversion processing on the basis of the result of the judgment processing and outputs the produced picture to be displayed to the user. The detection area may be decided by the user input module 0103.

The detection area is decided in the three-dimensional space on the basis of the detection area setting data. When the judgment processing is made, it is necessary to coincide the coordinate system of the three-dimensional space to which the detection area belongs (hereinafter referred to as a reference coordinate system) with the coordinate system of the three-dimensional coordinates acquired by the three-dimensional position detection module 0102. Accordingly, the reference coordinate system can be used as the coordinate system of the three-dimensional coordinates acquired by the three-dimensional position detection module 0102, so that the conversion processing of the coordinate system is not required and time and labor can be reduced. However, the reference coordinate system can be changed arbitrarily if necessary when an object intruding into a room is detected or when a vehicle approaching a vehicle in which the object detection apparatus is mounted is detected or the like. In this case, when the reference coordinate system is decided, external parameters indicating relative translation and rotation of the coordinate system between the reference coordinate system and the coordinate system of the three-dimensional coordinates acquired by the three-dimensional position detection module 0102 can be calculated to thereby convert the coordinate system when the judgment processing is made.

The picture conversion processing of the picture processing module 0104 is made in order to clearly express the detection area decided by the detection area setting data inputted by the user in the picture. In the picture conversion processing, when the three-dimensional coordinates exist inside the detection area, the area corresponding to the three-dimensional coordinates is subjected to the conversion processing, so that the detection area can be emphasized to be expressed clearly to the user. Further, when the three-dimensional coordinates exist outside the detection area, the area corresponding to the three-dimensional coordinates is subjected to the conversion processing, so that the detection area may be masked. Moreover, when the three-dimensional coordinates are positioned at the boundary of the detection area, the area corresponding to the three-dimensional coordinates is subjected to the conversion processing, so that only the boundary of the detection area may be emphasized. Such picture conversion processing may convert the brightness signals of pixels in the picture desired to be subjected to the conversion processing to be bright or dark or may convert the color signals to give specific color. The picture produced by the picture conversion processing enable the user to clearly look at the detection area set by the user himself. At this time, the signals may be converted to be different brightness signals or different color signals in accordance with the distance from a reference position of the detection area, so that a feeling of distance can be given to the user. Further, picture quality improvement processing such as noise elimination and sharpness may be made as pre-processing if necessary. The parameters such as the detection area setting data inputted by the user may be displayed in the picture. The picture conversion processing may be made limitedly when the user sets the detection area and the usual picture may be displayed after setting, although even after the user sets the detection area, the detection area subjected to the picture conversion processing may be always displayed, so that the detection area may be referred even when the user looks at the picture for the purpose of monitoring.

When the picture conversion processing is performed, the area of the picture corresponding to the three-dimensional coordinates is decided by converting the coordinate system of the three-dimensional coordinates acquired by the three-dimensional position detection module 0102 into the two-dimensional coordinate system of the picture (hereinafter referred to as the picture coordinate system). In order to make the coordinate conversion, the three-dimensional position information acquired by the three-dimensional position detection module 0102 is first converted from the coordinate system based on the three-dimensional position detection module 0102 into the camera coordinate system based on the imaging module 0101 on the basis of the external parameters indicating information of relative rotation and translation between the imaging module 0101 and the three-dimensional position detection module 0102. Then, the camera coordinate system based on the imaging module 0101 is converted into the picture coordinate system in the picture imaged by the imaging module 0101 on the basis of internal parameters indicating focal distance, lens distortion and the like of the imaging module 0101. The external parameters may be calculated automatically by means of the known method using marker in space and natural feature or may be calculated by strictly measuring space of installation, depression angles, estimated angles and installation heights of the imaging module 0101 and the three-dimensional position detection module 0102 by a special technician. Further, the internal parameters may be calculated using the marker upon shipping from a factory or installation or after installation. When the coordinate system is converted by the picture conversion processing, these parameters are previously calculated to be stored in a memory or these parameters are corrected properly by correction processing to be used.

Figure 2:
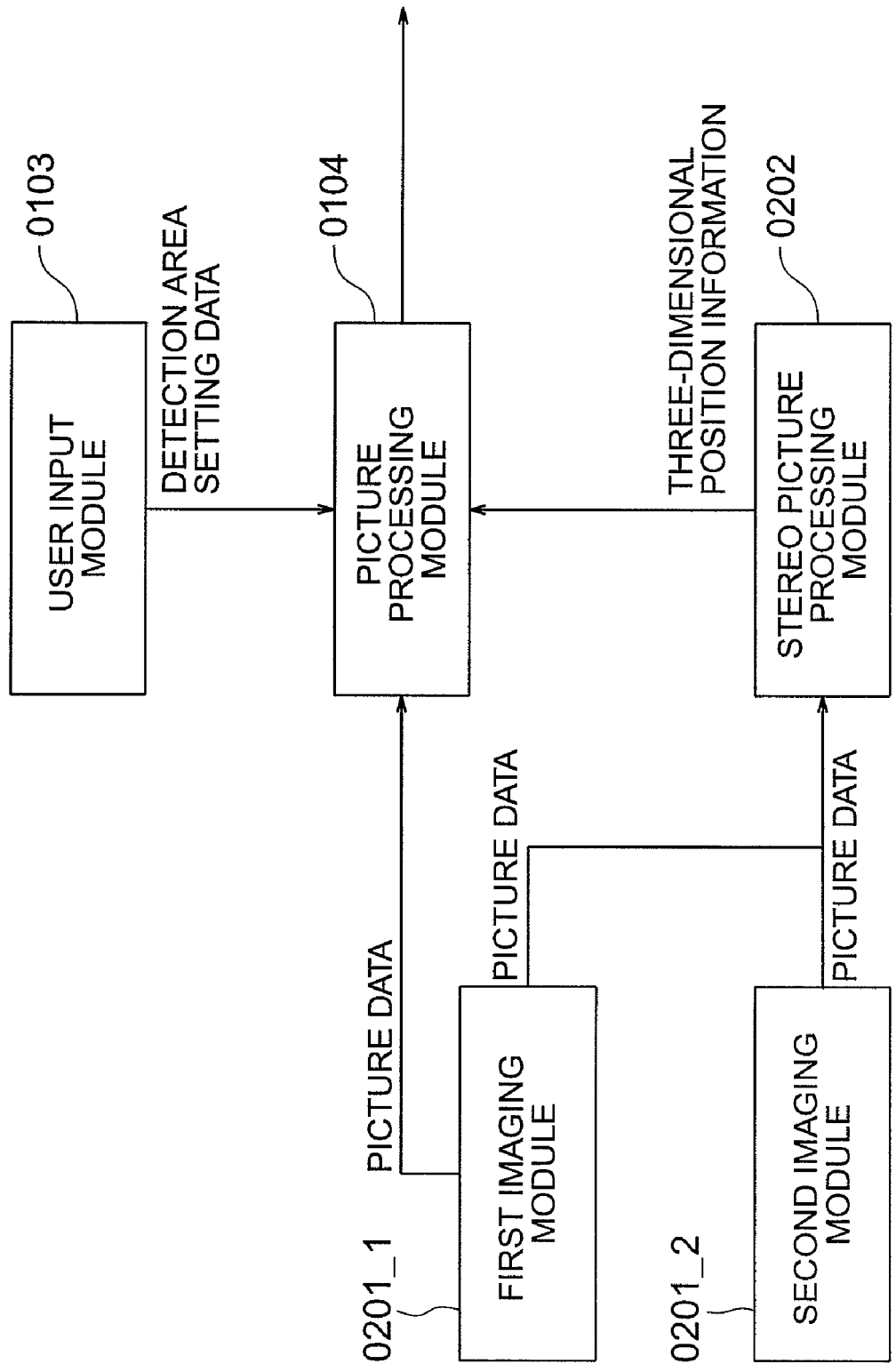
FIG. 2 is a schematic diagram illustrating the object detection apparatus using stereo imaging modules in the object detection apparatus according to the first embodiment of the present invention.

FIG. 2 is a schematic diagram illustrating the case where stereo imaging is used in the embodiment. In FIG. 2, numeral 0201_1 denotes a first imaging module, 0201_2 a second imaging module, 0202 a stereo picture processing module, 0103 a user input module and 0104 a picture processing module.

In the object detection apparatus shown in FIG. 2, the stereo picture processing module 0202 makes stereo picture processing using picture data outputted by the first imaging module 0201_1 and picture data outputted by the second imaging module 0201_2 and calculates distance information to be outputted. In the configuration of FIG. 2 as compared with that shown in FIG. 1, the first or second imaging module 0201_1 or 0201_2 corresponds to the imaging module 0101 and the first and second imaging modules 0201_1 and 0201_2 and the stereo picture processing module 0202 correspond to the three-dimensional position detection module 0102. At this time, the imaging module which supplies the picture data to the picture processing module 0104 may be the first or second imaging module 0201_1 or 0201_2 or both of them. In this manner, even when the stereo imaging module composed of the first and second imaging modules 0201_1 and 0201_2 and the stereo picture processing module 0202 is used instead of the imaging module 0101 and the three-dimensional position detection module 0102, the object detection apparatus can be treated as the same configuration as that shown in FIG. 1. Similarly, a multi-imaging module having three or more imaging modules may be used. When the stereo imaging or the multi-imaging is used, it is not necessary to provide the imaging module and the three-dimensional position detection module separately and accordingly it is easy to match the three-dimensional coordinate systems of the imaging module and the three-dimensional position detection module with each other. Further, when the imaging module and the three-dimensional position detection module are provided separately, there can avoid a problem that the dead angle area is formed by one of them since installation positions thereof are different from each other.

Figure 3:
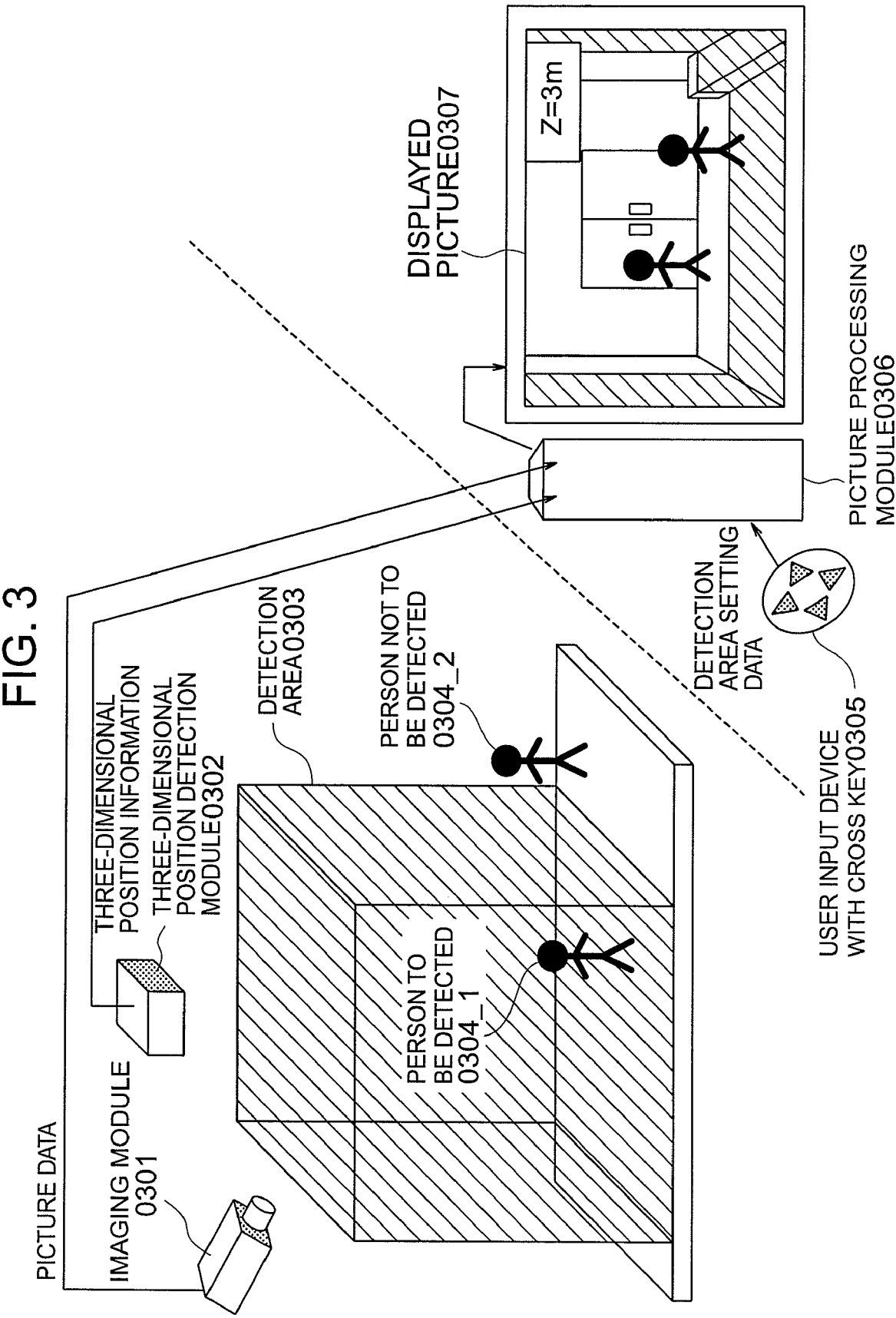
FIG. 3 is a schematic diagram illustrating a use example of the object detection apparatus according to the first embodiment of the present invention.

FIG. 3 is a schematic diagram illustrating a use example of the object detection apparatus according to the first embodiment of the present invention. In FIG. 3, numeral 0301 denotes the imaging module, 0302 the three-dimensional position detection module, 0303 the detection area, 0304_1 a person, 0304_2 another person, 0305 the user input device with cross key, 0306 the picture processing module and 0307 a displayed picture.

In FIG. 3, the picture 0307 in which the area corresponding to the detection area 0303 is emphasized in the picture data outputted by the imaging module 0301 is displayed to clearly express the detection area to the user. In this example, when the three-dimensional coordinates acquired by the three-dimensional position detection module 0302 exist inside the detection area 0303, the brightness signals in the area corresponding to the detection area in the displayed picture 0307 are converted and the detection area is displayed with slant lines. The user can operate the user input device 0305 with cross key to thereby change the three-dimensional position of the detection area 0303. In this use example, even when the user sets the detection area 0303 while looking at the displayed picture 0307 to thereby change the detection area 0303 by the user input device 0305 with cross key, the user can grasp the currently set detection area visually to improve the operability. Data of "Z=3 m" indicating that the size of the detection area is set to 3 m currently is displayed in the upper right part of the displayed picture 0307. In this manner, by displaying the detection area setting data in the picture, the user can make a memo of the detection area setting data inputted by the user by means of the cross key or the like easily and the detection area can be reproduced easily when it is set again. Further, the displayed picture 0307 may be watched in a monitor connected directly to the picture processing module 0306 or may be watched in a remote monitor to which the picture processing module 0306 is connected through a network.

The object detection apparatus according to the embodiment can be used to detect the intrusion. In FIG. 3, the person 0304_1 exists inside the detection area 0303 and is to be detected. The person 0304_2 exists outside the detection area 0303 and is not to be detected. When the person 0304_2 moves to enter the detection area 0303, the person 0304_2 is to be detected. In this manner, a moving person or object (hereinafter referred to as a moving object) is pursued on the time axis and it is judged whether the three-dimensional position of the moving object acquired by the three-dimensional position detection module 0302 exists inside or outside of the detection area 0303, so that the fact that the three-dimensional position of the moving object moves to the inside from the outside of the detection area can be detected to thereby detect the intrusion of the moving object into the detection area 0303.

The pursuit of the moving object may be carried out by performing pursuit processing by picture processing to the picture acquired by the imaging module 0301, while the three-dimensional position information acquired by the three-dimensional position detection module 0302 may be combined therewith to carry out it. Moreover, not only movement from the outside of the detection area to the inside thereof is detected but also approach to the detection area 0303 may be detected. In this case, the object detection apparatus can be applied to change processing operation in accordance with the positional relation of the moving object and the detection area 0303 so that an alarm is displayed in the picture screen when the moving object approaches the detection area 0303 and the alarm is sounded when the moving object intrudes into the detection area 0303. Further, movement of the moving object from the inside of the detection area 0303 to the outside thereof can be detected to prevent an infant from being missing and movement of the moving object from the outside of the detection area 0303 to the inside thereof can be detected so that it is judged that the moving object is left behind when the moving object stands still for a long time as it is.

The object detection apparatus can be applied to identify the object to be detected and detect that only a specific object intrudes into the detection area by combining the picture processing with the three-dimensional position information and acquiring three-dimensional information such as the position and the size of the detection object in the three-dimensional space. The three-dimensional information of the detection object acquired at this time may be outputted to be displayed in the displayed picture 0307. The user can look at the displayed picture 0307 to grasp where the detection object is positioned in the real space or how far the actual size of the detection object is, so that monitoring performance in the detection of intrusion can be improved.

As described above, according to the embodiment, there can be realized the object detection apparatus with improved operability that can display the detection area in the picture and can make the user change the detection area by simple operation while visually grasping the detection area set currently even when the detection area is decided in the three-dimensional space in setting of the detection area.

Embodiment 2

Figure 4:
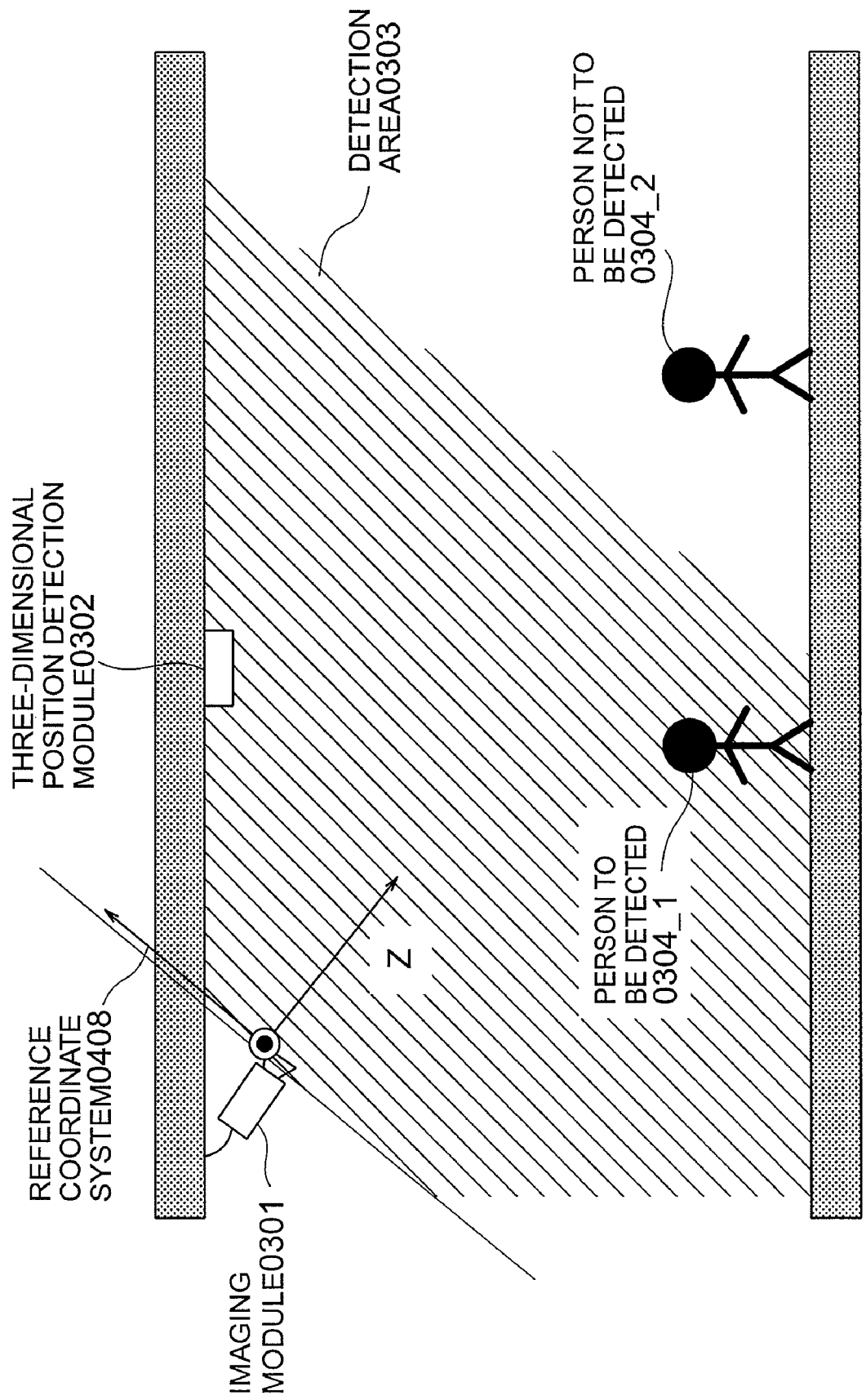
FIG. 4 is a schematic diagram illustrating an example of a method of setting the detection area of an object detection apparatus according to a second embodiment of the present invention.

FIG. 4 is a schematic diagram illustrating an example of a method of setting the detection area of an object detection apparatus according to a second embodiment of the present invention. In the embodiment, the camera coordinate system based on the imaging module 0301 is set to the reference coordinate system 0408. At this time, the detection area 0303 is decided using the detection area setting data inputted by the user in the reference coordinate system 0408.

The displayed picture referred by the user is produced by subjecting the picture imaged by the imaging module 0301 to the picture processing. Accordingly, when the user sets the three-dimensional position of the detection area, the reference coordinate system 0408 is used to coincide the imaging direction of the imaging module 0301 with the depth direction when the detection area 0303 is set. Consequently, for example, when the detection area is decided in accordance with a distance from the reference position, the user can set the detection area more intuitively. Further, since the external parameters necessary for the coordinate conversion processing when the judgment processing is made is the same as the external parameters necessary for the coordinate conversion processing when the picture conversion processing is made in the picture processing module 0104, a working burden for calculating the external parameters can be lightened.

Not only when the detection area is decided but also when the three-dimensional information of the detection object is acquired in the detection of intrusion, the reference coordinate system 0408 may be used. For example, when the three-dimensional position of the detection object converted to the reference coordinate system 0408 is used, the Z coordinates of the detection object are equal to a distance from the imaging plane of the imaging module 0301 to the detection object and accordingly the position of the detection object can be grasped easily. Further, a distance in a straight line from the imaging module 0301 to the detection object can be acquired easily instead of the distance from the imaging plane. By displaying the distance acquired thus to the detection object based on the reference coordinate system 0408 in the picture screen, the user can grasp the position and the like of the detection object intuitively.

As described above, according to the embodiment, there can realize the object detection apparatus which is suitable for the case where the user sets the detection area by using the distance information from the imaging module and can set the detection area intuitively.

Embodiment 3

Figure 5:
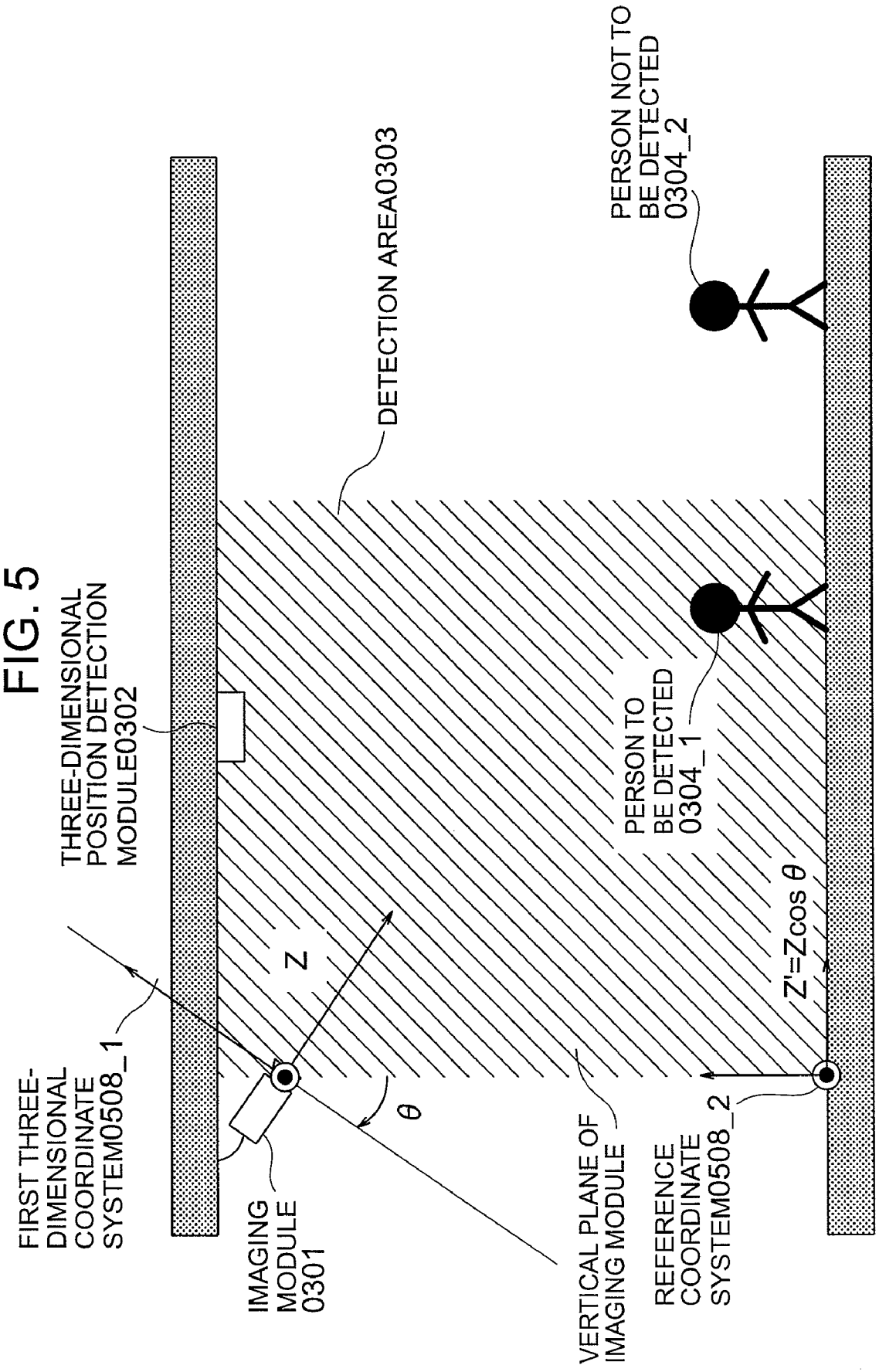
FIG. 5 is a schematic diagram illustrating an example of a method of setting the detection area of an object detection apparatus according to a third embodiment of the present invention.

FIG. 5 is a schematic diagram illustrating an example of a method of setting the detection area in an object detection apparatus according to a third embodiment of the present invention. In the embodiment, the coordinate system having the origin composed of the intersection point of the vertical line passing through the imaging module 0301 and the floor plane, the Y axis composed of the vertical line and the X and Z axes passing through the origin and extending orthogonally to each other in parallel to the floor plane is used as the reference coordinate system 0508_2. At this time, the detection area 0303 is decided using the detection area setting data inputted by the user in the reference coordinate system 0508_2.

In order to convert the three-dimensional coordinate system of the three-dimensional position outputted by the three-dimensional position detection module 0302 into the reference coordinate system 0508_2, the three-dimensional position information acquired by the three-dimensional position detection module 0302 is converted from the camera coordinate system based on the three-dimensional position detection module 0102 into the first three-dimensional coordinate system 0508_1 constituting the camera coordinate system based on the imaging module 0301 on the basis of first external parameters indicating information of relative rotation and translation between the imaging module 0301 and the three-dimensional position detection module 0302 and the coordinate system 0508_1 is converted into the reference coordinate system 0508_2 on the basis of second external parameters indicating information of relative rotation and translation between the reference coordinate system 0508_2 and the imaging module 0301. The first external parameters may be calculated automatically by means of the known method using marker in space and natural feature or may be calculated by strictly measuring space of installation, depression angles, estimated angles and heights of installation of the imaging module 0301 and the three-dimensional position detection module 0302 by a special technician. Similarly, the second external parameters can be calculated by using a depression angle, an estimated angle and height of installation of the imaging module 0301.

When the object detection apparatus is used for monitoring, the imaging module 0301 is installed to look down the floor plane from the ceiling or to look down the floor plane with a depression angle from the ceiling or the sidewall. Further, when the object detection apparatus is used or mounted in a vehicle, the imaging module 0301 is installed to look down the road with a depression angle from the body of the vehicle. In this manner, when the imaging module 0301 is installed not to be parallel with the horizontal plane, the cameral coordinate system based on the imaging module 0301 has the Z axis extending in the imaging direction of the imaging module 0301 with a depression angle to the horizontal plane. However, when the detection of intrusion is performed for monitoring or in the vehicle, the moving object often moves horizontally on the floor or road. Accordingly, even when the detection area is decided, it is desired that the detection area can be decided so that an area within a fixed distance from the vertical plane or line passing through the imaging module 0301 is set as the detection area. Accordingly, as shown in FIG. 5, the reference coordinate system 0508_2 can be used to set the detection area suitable for the case where the detection of intrusion is performed.

Not only when the detection area is decide but also when the three-dimensional information of the detection object is acquired in the detection of intrusion, the reference coordinate system 0508_2 may be used. When the three-dimension position of the detection object converted to the reference coordinate system 0508_2 is used, the Z coordinates of the detection object are equal to the distance from the vertical plane passing through the imaging module 0301 to the detection object. Accordingly, even when the imaging module 0301 is installed with a depression angle, it is easy to grasp the distance to the detection object moving horizontally such as a person moving in a room or a vehicle on a road. A distance in a straight line from the vertical line passing through the imaging module 0301 to the detection object can be calculated easily instead of the distance from the vertical plane passing through the imaging module 0301. Further, since the size of the detection object converted to the reference coordinate system 0508_2 is equal to the height of the detection object from the floor plane, it can be treated as the stature for a person and as the height for a vehicle. When the distance to the detection object and the height thereof obtained above based on the reference coordinate system 0508_2 are displayed in the picture screen, the user can grasp the position and the height of the detection object easily even when the imaging module 0301 is installed with a depression angle.

As described above, according to the embodiment, the user can set the detection area using the distance from the vertical plane or line passing through the imaging module, so that setting of the detection area suitable for the intrusion detection can be realized.

Embodiment 4

Figure 6:
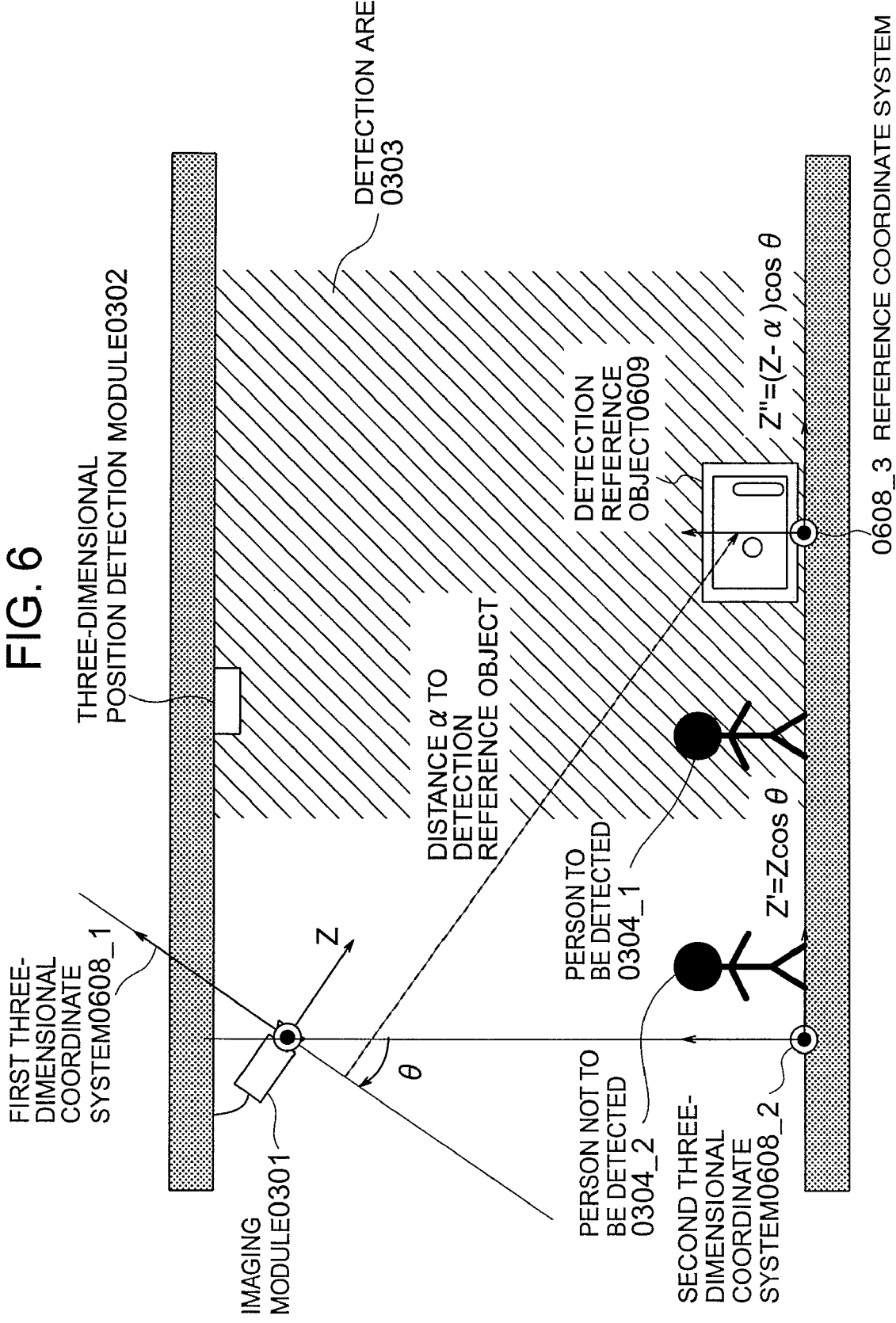
FIG. 6 is a schematic diagram illustrating an example of a method of setting the detection area of an object detection apparatus according to a fourth embodiment of the present invention.

FIG. 6 is a schematic diagram illustrating an example of a method of setting the detection area in an object detection apparatus according to a fourth embodiment of the present invention. In the embodiment, the coordinate system having the origin composed of the intersection point of the vertical line passing through a detection reference object 0609 that is the object designated by the user and the floor plane, the Y axis composed of the vertical line and the X and Z axes passing through the origin and extending orthogonally to each other in parallel to the floor plane is used as the reference coordinate system 0608_3. At this time, the detection area 0303 is decided using the detection area setting data inputted by the user in the reference coordinate system 0608_3.

In order to convert the three-dimensional coordinate system of the three-dimensional position outputted by the three-dimensional position detection module 0302 into the reference coordinate system 0608_3, the three-dimensional position information acquired by the three-dimensional position detection module 0302 is converted from the camera coordinate system based on the three-dimensional position detection module 0302 into the first three-dimensional coordinate system 0608_1 constituting the camera coordinate system based on the imaging module 0301 on the basis of first external parameters indicating information of relative rotation and translation between the imaging module 0301 and the three-dimensional position detection module 0302 and the first three-dimensional coordinate system 0608_1 is converted into the second three-dimensional coordinate system 0608_2 on the basis of second external parameters indicating information of relative rotation and translation between the second three-dimensional coordinate system 0608_2 and the imaging module 0301. Then, the second three-dimensional coordinate system 0608_2 may be moved in parallel so that the origin thereof is composed of the intersection point of the vertical ling passing through the detection reference object 0609 and the floor plane. The first external parameters may be calculated automatically by means of the known method using marker in space and natural feature or may be calculated by strictly measuring space of installation, depression angles, estimated angles and heights of installation of the imaging module 0301 and the three-dimensional position detection module 0302 by a special technician. Similarly, the second external parameters can be calculated by using a depression angle, an estimated angle and height of installation of the imaging module 0301. Moreover, the amount of movement necessary for the parallel movement can be calculated on the basis of the distance between the imaging module 0301 and the detection reference object 0609 and a depression angle, an estimated angle and height of installation of the imaging module 0301.

There is a case where the intrusion detection using a specific object as the reference is required so as to detect something approaching a specific valuable object such as precious metals and a safe. In this case, it is desired that the area within a fixed distance from the vertical plane or line passing through the detection reference object 0609 can be decided to be the detection area. Accordingly, as shown in FIG. 6, the reference coordinate system 0608_3 is used to set the detection area suitable for the case where the intrusion detection using the specific detection reference object 0609 as the reference is made. The three-dimensional position of the detection reference object 0609 may be designated by the user in the picture acquired by the imaging module 0301 or the user may arrange a marker in the position where the detection reference object 0609 is to be disposed and extract the position of the marker to thereby acquire it as the three-dimensional position of the detection reference object 0609.

Not only when the detection area is decided but also when the three-dimensional information of the detection object is acquired in the intrusion detection, the reference coordinate system 0608_3 may be used. When the three-dimensional position of the detection object converted to the reference coordinate system 0608_3 is used, the Z coordinates of the detection object are equal to a distance from the vertical plane passing through the detection reference object 0609 to the detection object and accordingly even when the imaging module 0301 is installed with a depression angle, it is easy to grasp a person or a vehicle approaching the detection reference object 0609. A distance in a straight line from the vertical plane passing through the detection reference object 0609 to the detection object can be also calculated easily instead of the distance from the vertical plane passing through the detection reference object 0609. Further, since the size of the detection object converted to the reference coordinate system 0608_3 is equal to the height of the detection object from the floor plane, it can be treated as the stature for a person and as the height for a vehicle. When the distance to the detection object and the height thereof obtained above based on the reference coordinate system 0608_3 are displayed in the picture screen, the user can grasp the position and the height of the detection object approaching the specific object easily even when the imaging module 0301 is installed with a depression angle.

As described above, according to the embodiment, the user can set the detection area using the distance from the vertical plane or line passing through the specific object designated by the user and setting of the detection area suitable for the intrusion detection using the object designated by the user as the reference can be realized.

Embodiment 5

FIG. 7 is a schematic diagram illustrating an example of an object detection apparatus according to a fifth embodiment of the present invention. In the embodiment, a picture of only an area corresponding to the floor plane 0703_1 within the detection area 0303 is converted. The area of which a picture is converted is limited to the area corresponding to the three-dimensional position of the floor plane within the detection area, so that the user can grasp the detection area planarly to understand it intuitively. Further, when the three-dimensional position of an object having a complicated shape is detected, there is a possibility that a wrong three-dimensional position is detected. In such a case, there is a possibility that an area of which a picture should not be converted originally is displayed due to the wrong detection, although conversion of the picture is limited to the floor plane, so that the wrong three-dimensional position is prevented from being displayed on the displayed picture due to the wrong detection. The sidewall may be used instead of the floor plane.

As described above, according to the embodiment, the detection area can be displayed to be limited to the floor plane, so that the displayed picture can be produced so that the user can grasp the detection area easily.

Embodiment 6

Figure 9:
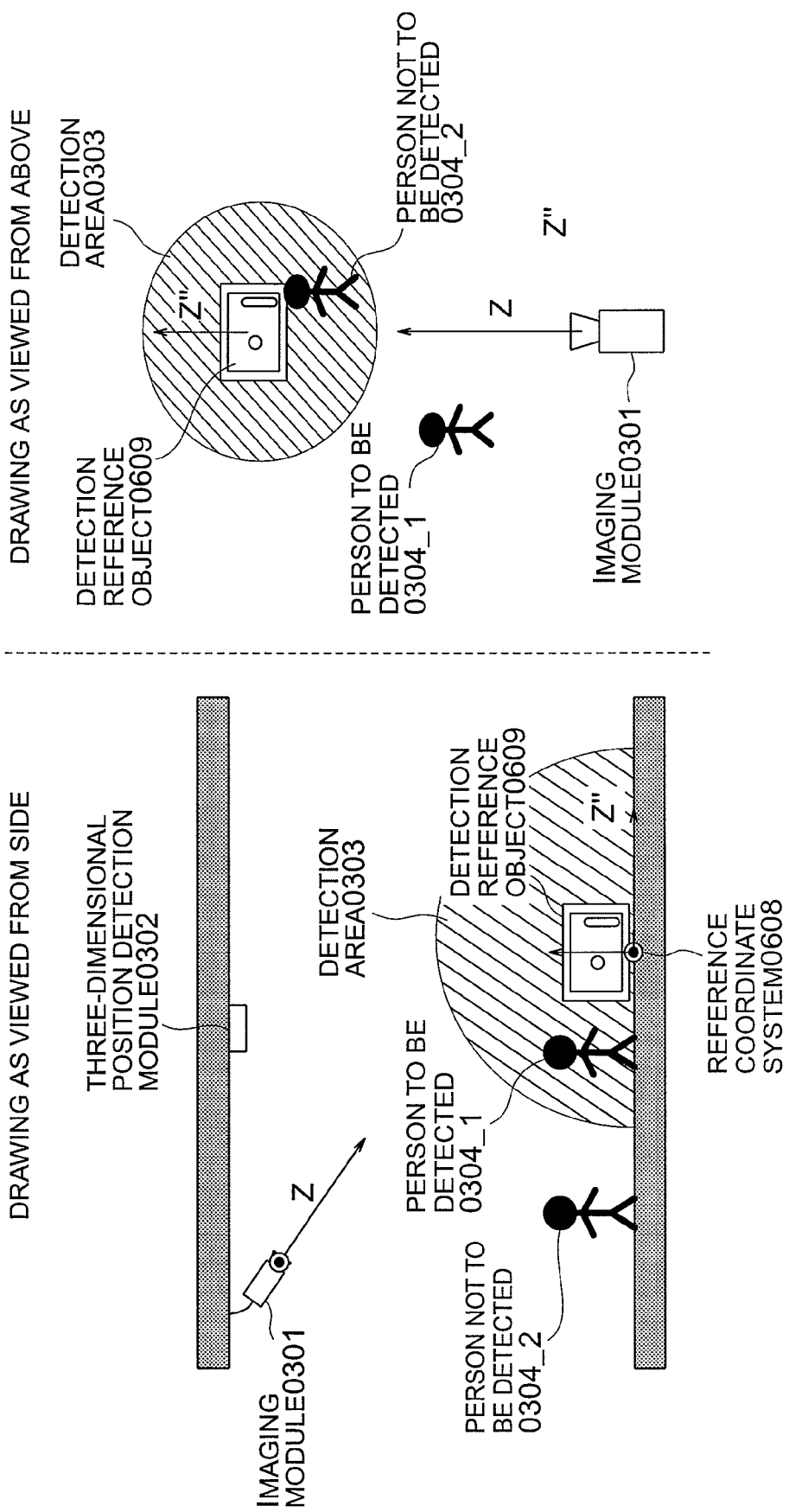
FIG. 9 is a schematic diagram illustrating a second example of the object detection apparatus according to the sixth embodiment of the present invention.

FIGS. 8 and 9 are schematic diagrams illustrating examples of an object detection apparatus according to a sixth embodiment of the present invention. In the embodiment, only one or plural data of shape, size, reference position and direction of the detection area can be inputted as the detection area setting data to set the detection area. In FIG. 8, the detection area 0303 is decided by inputting the size of the detection area and information indicating that the reference position of the detection area corresponds to the intersection point of the vertical line of the imaging module 0301 and the floor plane as the detection area setting data. In FIG. 9, the detection area 0303 is decided by inputting the shape of the detection area being a sphere, the size of the detection area and information indicating that the reference position of the detection area corresponds to the intersection point of the vertical line of the detection reference object 0609 that is an object designated by the user and the floor plane as the detection area setting data. In this manner, the user can merely input the set data in a necessary number for deciding the detection area without using the three-dimensional position information to thereby set the detection area in the three-dimensional space. Accordingly, the user can change the three-dimensional position of the detection area by simple operation so that the size of the detection area is increased or reduced and the reference position of the detection area is changed by operating the user input device 0305 with cross key shown in FIG. 3.

As described above, according to the embodiment, the user can set the detection area with simple operation and flexibly in accordance with use.

Embodiment 7

FIG. 10 is a schematic diagram illustrating an example of an object detection apparatus according to a seventh embodiment of the present invention. In the embodiment, the user can input the detection area setting data by using information of the object set and designated by the user without using an external input device such as the user input device 0305 with cross key shown in FIG. 3. In FIG. 10, the user utilizes an object 1010_1 disposed in space as a marker and sets the detection area on the basis of the three-dimensional position of the object 1010_1 detected by the three-dimensional position detection module 0302. In this case, the user merely disposes the object forming the marker in the position in which the user wishes to set the detection area, so that the detection area can be set more simply as compared with the case where the external input device is used. However, when the detection area is changed, it is necessary to re-arrange the object and accordingly this method is suitable when it is not necessary to change the detection area frequently. Further, in this case, the three-dimensional coordinate system shifted before and behind from the three-dimensional position may be used to set the detection area instead of using the three-dimensional position of the user designated object 1010_1 to set the detection area. Consequently, even when the extraction accuracy of the three-dimensional position of the user designated object 1010_1 is deteriorated, the area necessary for detection can be ensured.

Moreover, the user may designate an object in the picture and use the three-dimensional position corresponding to the object instead of using the three-dimensional position of the object disposed in space by the user. In this case, the user can eliminate time and labor required to set the marker actually.

As described above, according to the embodiment, the three-dimensional position of the object designated by the user can be used upon setting of the detection area, so that the detection area can be set by a more simple method without operating the external input device by the user.

The present invention can be utilized in monitoring cameras, three-dimensional cameras and on-vehicle cameras.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An object detection apparatus comprising:
an imaging module to image a subject to be imaged and output a picture signal;
a three-dimensional position detection module to detect a three-dimensional position of an object in the subject to be imaged and output three-dimensional position information;
an input module to input three-dimensional detection area setting data for setting a detection area as a three-dimensional detection area;
an output module to output a picture signal to a display module;
a picture processing module to carry out conversion processing to the picture signal; and
a control module to control to make the picture processing module carry out the conversion processing to the picture signal existing inside and/or outside the three-dimensional detection area so that the inside and the outside of the three-dimensional detection area can be distinguished on the basis of the three-dimensional position information outputted by the three-dimensional position detection module and the three-dimensional detection area setting data inputted by the input module and to output the picture signal subjected to the conversion processing from the output module for display in superposition with the set three-dimensional detection area.

2. An object detection apparatus comprising:
an imaging module to make imaging and output an imaged picture;
a three-dimensional position detection module to detect a three-dimensional position of an object in space and output three-dimensional position information;
a user input module to make a user input three-dimensional detection area setting data for setting a detection area as a three-dimensional detection area; and
a picture processing module to carry out conversion processing to the picture and output a produced picture; and wherein
the three-dimensional detection area setting data is used to decide the three-dimensional detection area, and
whether each of three-dimensional coordinates within the three-dimensional position information exists inside or outside the three-dimensional detection area is judged,
the picture outputted by the imaging module being subjected to the conversion processing on the basis of judgment result to output the produced picture for display in superposition with the set three-dimensional detection area.

3. An object detection apparatus according to claim 2, wherein temporal change of the three-dimensional position information and information of the detection area are used to detect intrusion.

4. An object detection apparatus according to claim 2, wherein the detection area setting data is used in a camera coordinate system based on a position of the imaging module to decide the detection area.

5. An object detection apparatus according to claim 2, wherein the detection area setting data is used in a coordinate system having the origin composed of an intersection point of a vertical line passing through the imaging module and a floor plane, the Y axis composed of the vertical line and the X and Z axes passing through the origin and extending orthogonally to each other in parallel to the floor plane to decide the detection area.

6. An object detection apparatus according to claim 2, wherein the detection area setting data is used in a coordinate system having the origin composed of an intersection point of a vertical line passing through an object designated by the user and a floor plane, the Y axis composed of the vertical line and the X and Z axes passing through the origin and extending orthogonally to each other in parallel to a floor plane to decide the detection area.

7. An object detection apparatus according to claim 2, wherein a floor plane is detected, and whether a three-dimensional position corresponding to the floor plane exists inside or outside the detection area is judged, the picture outputted by the imaging module being subjected to the conversion processing on the basis of judgment result to output the produced picture.

8. An object detection apparatus according to claim 2, wherein one or a plurality of pieces of information of shape, size, reference position and direction of the detection area are used as the detection area setting data.

9. An object detection apparatus according to claim 2, wherein a three-dimensional position of an object designated by the user is detected and the three-dimensional position is used for the detection area setting data.

* * * * *